Dec. 9, 1952     J. P. PLEVAK ET AL     2,621,071
AUTOMOBILE SUN VISOR
Filed Oct. 8, 1948     2 SHEETS—SHEET 1
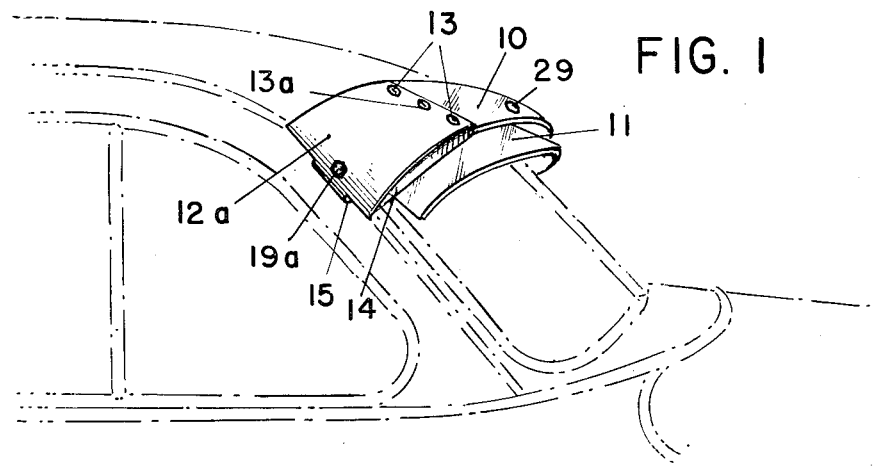
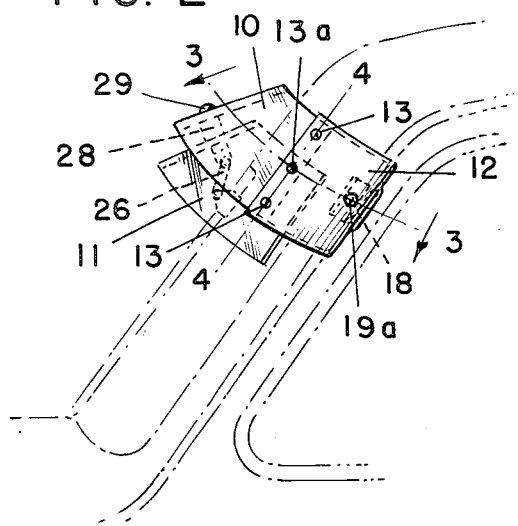
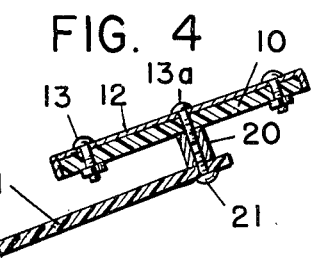
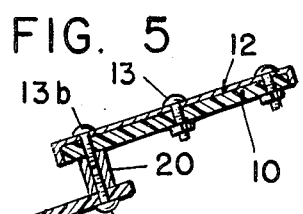
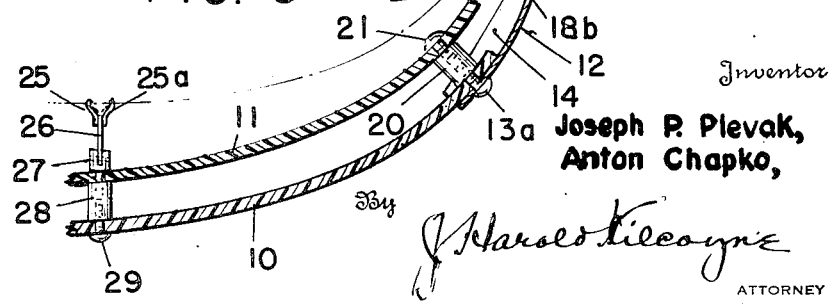
Inventor
Joseph P. Plevak,
Anton Chapko,
By J. Harold Kilcoyne
ATTORNEY Dec. 9, 1952  J. P. PLEVAK ET AL  2,621,071
AUTOMOBILE SUN VISOR
Filed Oct. 8, 1948  2 SHEETS—SHEET 2
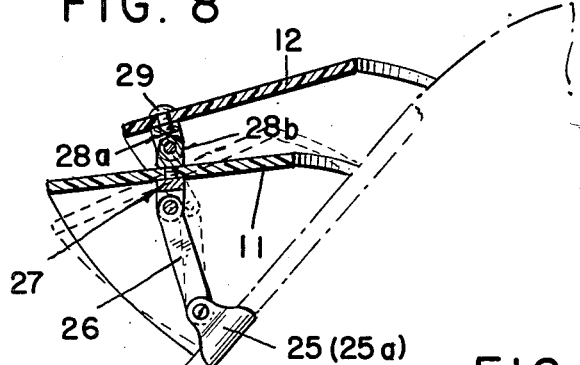
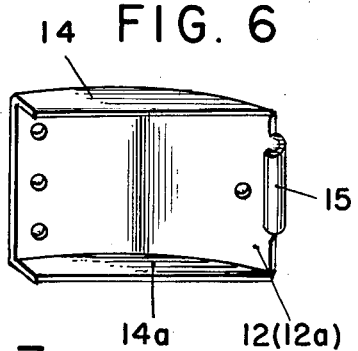
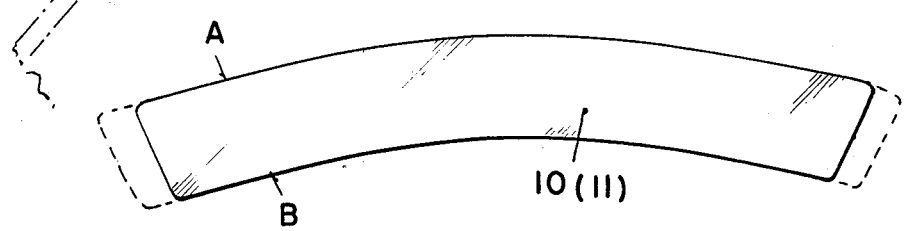
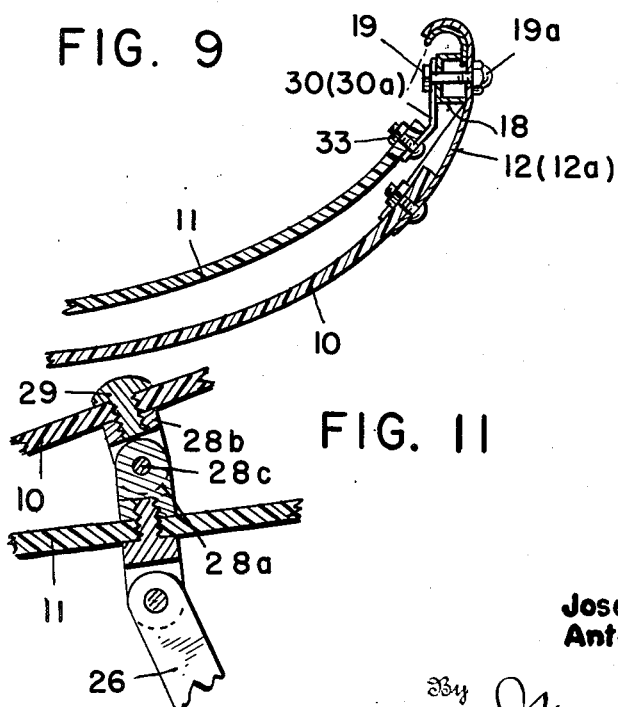
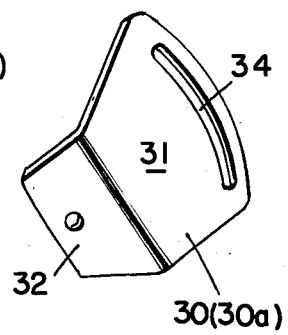
Inventor
Joseph P. Plevak,
Anton Chapko,
ATTORNEY Patented Dec. 9, 1952

2,621,071

UNITED STATES PATENT OFFICE 2,621,071

AUTOMOBILE SUN VISOR

Joseph P. Plevak and Anton Chapko, South Milwaukee, Wis., assignors to Lawrence V. Shuetta, Joseph L. Shuetta, Jr., and George C. Shuetta, all of Racine, Wis., a partnership Application October 8, 1948, Serial No. 53,524

7 Claims. (Cl. 296—95)

This invention relates to improvements in automobile sun visors of the type adapted to be mounted forwardly of a windshield in supporting brackets which are usually clamped to the rain gutters formed in the body to the sides of the windshield.

Prior sun visors of this type usually employ a single visor panel having a substantial depth dimension. While functioning satisfactorily as a light or glare screen, the prior single-panel visor is open to the objection that due to the depth of its panel, the inclination at which it must be maintained to be effective, and the stresses acting on the panel in the forward movement of the automobile, particularly at the higher speeds, it must be elaborately supported and braced at its ends, with additional intermediate bracing being also usually required. From the appearance standpoint also, the single-panel visor is objectionable to many users, as failing to follow the flowing body and windshield lines of the modern automobile.

One object of the present invention is to provide an automobile visor which overcomes the above-noted disadvantages of the prior visors while at the same time satisfying the functional requirements of a device of this character, and which is further of attractive appearance and of simple, streamline construction, lending itself admirably to installation on automobiles characterized by the flowing windshield and body lines of current automobile design.

More particularly, it is an object of the invention to provide an extremely practical and effective dual-panel visor, the two panels of which are disposed in spaced vertical relation analogous to the spaced relation of the slats of a Venetian blind, for example, and a novel mounting for said panels by which the visor may be mounted as a unit from the gutters to the sides of an automobile windshield, so as to extend forwardly of the windshield and to provide a light-screen extending across the upper portion thereof. An important feature of the dual-panel visor construction herein contemplated is that the distance which the visor panels project forwardly of the windshield is materially reduced as compared to the single-panel visor, without, however, detracting from the light-screening properties required in an automobile visor. The dual-panel construction of the present visor further lends itself to simple mounting and more effective support and bracing of the dual panels thereof than is possible with the prior single-panel visors.

More detailed features of the invention are to provide a dual-panel visor of the stated character which may be readily attached at a desired vertical elevation relative to windshield; to provide a dual-panel visor wherein the mounting of the panels permits of their relative adjustment forwardly of one another; and to provide a dual-panel visor as aforesaid wherein the lower panel is capable of angular tilt adjustment relative to the upper panel.

The above and other objects and features of a dual-panel visor as herein proposed will be apparent from the following detailed description, taken with the accompanying drawings illustrating the same, in which—

Fig. 1 is a perspective view showing the improved dual-panel visor installed on an automobile;

Fig. 2 is a side elevational view thereof;

Fig. 3 is an enlarged part-sectional view taken on line 3—3 of Fig. 2;

Fig. 4 is a section taken along line 4—4 of Fig. 2;

Fig. 5 is a section corresponding to Fig. 4, illustrating a more forward disposition of lower to upper panel than shown in Fig. 4, as permitted by the panel mounting means of the present invention;

Fig. 6 is an enlarged perspective view looking to the under side of one of the upper panel supporting brackets;

Fig. 7 is a developed plan view of one of the dual panels, which illustrates edge contouring thereof prior to its mounting in the supporting brackets;

Fig. 8 is a vertical section illustrating a modified center bracing means for the panels which provides for tilt adjustment of the lower panel;

Fig. 9 is a sectional view similar to Fig. 3, illustrating the modified panel supporting bracket means employed with the Fig. 8 modification;

Fig. 10 is an enlarged perspective view of the lower panel supporting bracket employed in the Figs. 8 and 9 modification; and Fig. 11 is an enlarged part-sectional view taken through the modified center bracing means shown in Fig. 8.

Referring to the accompanying drawings in detail, Figs. 1 and 2 illustrate a dual-panel visor according to the invention assembled on an automobile by clamping the same to the rain gutters formed in the body to the sides of the windshield, as is well known. Such a visor is comprised by upper and lower panels or slats 10, 11, respectively, supported by bracket means which in the embodiment being described comprise end brackets 12, 12a. By reference to Figs. 2 and 3, the upper panel 10 is secured directly to the end brackets by attaching screws 13, and the lower panel is secured to the end brackets in spaced underlying relation with respect to the upper panel by securing and spacing means to be described.

A typical panel 10 or 11 is illustrated in plan in Fig. 7. Preferably, such a panel is comprised by a molded or cut sheet of polarized plastic material which may be tinted to any desired color or shade, the top and bottom edges A and B of which are accurately preformed or precut to such curvature that when the visor is installed on an automobile of particular make and model, said edges will conform to and hug the curvature of the body lines adjacent the windshield and of the windshield itself. As indicated by the dotted and full-line end edges of the illustrated panel, the same are cut or trimmed to the required panel length for a particular installation. The illustrated panel is of the type that is sprung to desired transverse curvature when assembling the visor, but it may be molded to such curvature in cases where springing of the panel is not feasible. Although the use of polarized plastic material for the panels is preferred, it will be understood that other appropriate transparent light-screening or filtering materials may be employed, as well as metals such as light-gauge steel, aluminum, etc., which may be painted to harmonize with the color of the automobile.

By reference to Figs. 1, 2 and 6, the end brackets 12, 12a are identical, although of right-and-left-hand construction. Preferably, said brackets are formed as stampings from stainless steel or like material and are curved forwardly and thence inwardly from their attaching to their panel securing ends so as to space the upper panel 10 forwardly of and at a predetermined inclination to the automobile windshield. The vertical depth of the brackets corresponds to the depth of the upper panel, and they are preferably provided along top and bottom edges with flanges 14, 14a which extend inwardly the thickness of the plastic panel, thus to provide added strength to the bracket-panel joint as well as better appearance. As seen in Figs. 1 and 3, the inner ends of the brackets overlap the panel ends, connection therebetween being effected by the aforesaid attaching screws 13, which are vertically spaced and shown to be three in number.

As best seen in Fig. 6, the brackets are each formed with a curled-under tongue 15, projecting from the rearward attaching edge thereof, said tongue 15 being adapted to hook under the rain gutter provided in the body adjacent the windshield, as illustrated in Fig. 3. Complemental end-bracket securing means are shown to take the form of a short-length metal strip 18 of channel section arranged in inverted position and so that one flange 18a thereof bears against the free edge of the gutter, and the other flange 18b bears against the inner face of the end bracket, generally as shown. An attaching bolt 19 is adapted to be passed through the channel 18 and the tongue 15 prior to final assembly, and protrudes through the latter. An acorn nut 19a is threaded onto the protruding end of the bolt during assembly on an automobile, which when tightened, functions to securely clamp the end bracket 12 to the rain gutter. It will be understood that a similar connection of the opposite end bracket to the gutter at the other side of the windshield provides for mounting the upper panel forwardly of the windshield in the vertically inclined position generally illustrated in Figs. 1 and 2.

The aforesaid end securing and spacing means for the lower panel preferably makes use of one of the attaching screws 13 by which the upper panel is secured to the end brackets. In Fig. 4, the central attaching screw 13a is employed, being threaded into a chromium-plated spacing bushing or sleeve 20 disposed between the panels, an oppositely disposed attaching screw 21 threaded into the other end of the spacing sleeve completing the connection of lower panel to end bracket. It will be observed that the axial length of the spacing sleeve 20 determines the spacing between the upper and lower panels 10, 11, and that when the sleeve is held by the central upper attaching screw 13a the lower panel 11 substantially underlies the upper panel.

The aforesaid lower panel mounting also permits of a more forward disposition of lower to upper panel than is illustrated in Fig. 4. Thus, by reference to Fig. 5, the spacing sleeve 20 may be shifted forwardly to line up with the lowermost attaching screw 13b and the latter employed to secure the lower panel, via sleeve and screw 21, to the end bracket 12 in the more forward disposition illustrated.

To provide for bracing of the visor intermediate its ends, there is preferably provided simple center bracing means mounted from the vertical center strip between the sections of the windshield, said bracing means also including spacing means for the panels at their vertical center line. Referring to Figs. 2 and 3, such bracing means illustratively comprises a pair of oppositely disposed clamp jaws 25, 25a adapted to clamp on to the windshield center strip and being carried at one end of an inclined supporting link or strut 26, the other end of which is attached to a headed screw 27 whose head may be bifurcated to receive the strut end. The threaded shank of the screw 27 extends through the lower panel at its center line and threads into the lower end of a spacing sleeve 28 similar to the sleeve 20. An attaching screw 29 passed through the upper panel 10 threads into the other or upper end of the spacing sleeve to complete the connection. If desired, an additional center-line spacing sleeve may be provided at a higher level than the sleeve 28, being secured to the panels by screws passed therethrough and threading into the opposite ends of the sleeve, as aforesaid.

In addition to the forward adjustment of lower to upper panel, as described above, it will be observed that the visor unit as a whole may be adjusted to desired vertical elevation along the rain gutters through the simple procedure of loosening the attaching bolts 19 which secure the end brackets to the gutters, shifting the visor unit to the desired position, and again tightening the attaching bolts to clamp the unit in adjusted position.

Referring to Figs. 8–11, illustrating a modified dual-panel visor providing for angular tilt of one of the panels, for example, the lower panel 11, it will be seen that the upper panel 10 is mounted in end brackets 12, 12a as described above. In the modified visor, said end brackets 12, 12a function as component parts of panel supporting bracket means which also includes supplemental brackets 30, 30a, preferably constructed as shown in Fig. 10, and which mount the lower panel 11 of the visor. As shown, said brackets 30, 30a are each formed as sheet metal stampings having a sector-shaped body portion 31 and an extension 32 inclined inwardly thereof to lap an end of the lower panel to which it is secured as by means of a securing screw 33. The body portion of each lower panel securing bracket is formed with an arcuate slot 34 in its rearward edge portion.

To mount the supplemental brackets 30, 30a, they are disposed to underlie the upper panel end brackets 12, 12a, with their slotted body portions lying flush against the under face of the clamp members 18, which thus are disposed between the rearward ends of the outer and supplemental end brackets as seen in Fig. 9. The attaching or clamp bolts 19 are passed through the slots 34, so that upon tightening of the nuts thereof the supplemental end brackets 30, 30a are secured to the outer end brackets 12, 12a in the same operation required to clamp the outer brackets and hence the visor unit to the rain gutters. The aforesaid slotting of the supplemental end brackets permits the lower panel to be tilted along the length of the slots to desired angular position with respect to the upper panel.

In the modification providing for angular tilt of the lower panel, end panel spacing means corresponding to the spacing sleeves 20 are omitted, since the lower panel securing brackets 30, 30a make same unnecessary. However, center bracing and panel-spacing means are employed as in the prior modification, although it will be observed that when the lower panel is tilted relative to upper panel, the rigid spacing sleeve 28 is omitted and panel spacing means providing for the required relative movement of panels is substituted. To this end, and referring to Figs. 8 and 11, the center line spacing means preferably takes the form of interfitting tongue and bifurcated members 28a, 28b pivotally connected by a pin 28c, which together form articulated spacing means permitting angular tilt movement of the lower panel relative to upper panel. Otherwise, the center bracing means corresponds to that previously described in Fig. 3.

Without further analysis, it will be appreciated that a dual-panel visor as described in the foregoing has substantially reduced plan dimension as compared to the prior single panel type of visor, and since it projects a relatively small distance forward of the windshield, it may be more readily and simply mounted and supported than the prior visors. However, despite its reduced forward or plan dimension, the dual-panel visor as herein proposed nevertheless provides the required light- and glare-screening effect, through the arrangement of spaced upper and lower visors disposed in overlying-underlying relationship.

In addition to the advantage of simple mounting and support, the dual-panel visor herein proposed may be adjusted to desired vertical position relative to windshield by a simple manipulation; the lower panel may be moved forwardly with respect to the upper panel as required for best results; and where angular adjustment of the lower panel relative to upper panel is desired, the modified visor construction illustrated in Figs. 8–11 provides for such adjustment in simple and convenient manner.

It will also be observed from Figs. 1 and 2 that a dual-panel visor unit as proposed is shaped to conform to the curved and flowing lines of automobile bodies and windshields of current design and thus makes for cleaner lines and more attractive appearance than the prior single panel visors which generally extend in a straight plane across the windshield.

As many changes could be made in carrying out the above constructions without departing from the scope of the invention, it is intended that all matter contained in the above description or shown in the accompanying drawings shall be interpreted as illustrative and not in a limiting sense.

We claim:

1. A dual-panel automobile windshield visor comprising upper and lower visor panels, panel securing and spacing means operatively supporting said panels in vertically spaced, inclined relationship, said means including end brackets secured directly to the ends of the upper panel and curving outwardly and rearwardly from and in continuation of said upper panel and being provided along their rearward ends with means for clamping the visor as a unit to the rain gutters of the sides of the windshield, and means for indirectly securing the lower panel to said end brackets and being also effective to space the lower from the upper panel.

2. A dual-panel automobile windshield visor as set forth in claim 1, wherein said lower panel securing and spacing means includes spacer members disposed between the ends of the lower panel and the end brackets, said members being secured to said end brackets and the lower panel being secured to said members.

3. A dual-panel automobile windshield visor as set forth in claim 1, wherein said lower panel securing and spacing means includes supplemental end brackets underlying the first-named end brackets and being secured at their rearward ends to the rearward ends of the first-named end brackets.

4. A dual-panel automobile windshield visor comprising upper and lower visor panels, panel securing and spacing means mounting said panels in vertically spaced, inclined relationship and including end brackets operatively connected to the ends of the panels and incorporating means for clamping the visor as a unit to the rain gutters to the sides of the windshield, and spacing means operatively disposed between and connecting said panels for spacing them apart vertically, said spacing means having a variable connection with one of the panels which permits the lower panel to be shifted forwardly with respect to the upper panel.

5. A dual-panel automobile windshield visor comprising upper and lower visor panels, panel securing and spacing means mounting said panels in vertically spaced, inclined relationship and including end brackets operatively connected to the ends of the panels and incorporating means for clamping the visor as a unit to the rain gutters to the sides of the windshield, and spacing means operative between said panels for spacing them vertically, said means being also effective to vary the angular adjustment of the lower panel with respect to the upper panel.

6. A dual-panel automobile windshield visor comprising upper and lower panels, panel mounting and spacing means including outer end brackets fixed to the ends of the upper panel and extending outwardly and rearwardly therefrom, supplemental end brackets fixed to the ends of the lower panel and extending outwardly and rearwardly therefrom, the rearward ends of the supplemental end brackets underlying the corresponding ends of the outer end brackets, and means for securing the rearward ends of corresponding outer and supplemental end brackets to one another and being also operative to secure the end brackets to the rain gutters to the sides of the windshield.

7. A dual-panel automobile windshield visor comprising upper and lower panels, panel mounting and spacing means including outer end brackets fixed to the ends of the upper panel and extending outwardly and rearwardly therefrom, supplemental end brackets fixed to the ends of the lower panel and extending outwardly and rearwardly therefrom, the rearward ends of the supplemental end brackets underlying the corresponding ends of the outer end brackets, the rearward ends of the outer end brackets being formed to provide means adapted to hook under the rain gutters to the sides of the windshield, a clamp member disposed intermediate the rearward ends of the related outer and supplemental end brackets for clamping the free edge of each gutter against the inner face of the outer end bracket, and a clamp bolt passing through the rearward ends of the related end brackets and intermediate clamp member for drawing the same together, thereby to clamp the visor as a unit to the rain gutters and to secure the outer and supplemental end brackets to one another.

JOSEPH P. PLEVAK.
ANTON CHAPKO.

REFERENCES CITED

The following references are of record in the file of this patent:

UNITED STATES PATENTS

| Number | Name | Date |
|---|---|---|
| 1,615,078 | Grigsby | Jan. 18, 1927 |
| 2,334,856 | Atkinson | Nov. 23, 1943 |
| 2,495,662 | Scraper | Jan. 24, 1950 |

FOREIGN PATENTS

| Number | Country | Date |
|---|---|---|
| 719,898 | France | Feb. 12, 1932 |